Aug. 9, 1955  W. J. THOMPSON  2,714,951
TYPOGRAPHICAL COMPOSING MECHANISM
Filed March 4, 1952

INVENTOR
William J. Thompson
By Morrison Kinnear Campbell
ATTORNEYS

2,714,951

TYPOGRAPHICAL COMPOSING MECHANISM

William J. Thompson, Jamaica, N. Y., assignor to Mergenthaler Linotype Company, a corporation of New York Application March 4, 1952, Serial No. 274,808

9 Claims. (Cl. 199—27)

This invention relates to typographical composing machines, such as Linotype machines of the general organization represented in U. S. Letters Patent to O. Mergenthaler, No. 436,532, wherein circulating matrices and spacebands are selectively composed in an assembler by the operation of a keyboard, the assembler thereafter elevated to line transfer position, the composed line transferred therefrom to a mold for the casting of a type bar or slug, and the matrices and spacebands then returned to their respective storage magazines for further use.

In these machines, the matrices fall by gravity onto an inclined continuously moving conveyor belt and are delivered thereby to a rotary starwheel which stacks them one by one in the assembler elevator. Although the points of the starwheel do not operate in any timed relationship with the speed of travel of the matrices, the starwheel has always proved to be very satisfactory for commercial Linotype machines operating at standard speeds; however, at the higher operating speeds now employed in some of the more recent models, the starwheel exhibits an increased tendency to hurl the incoming matrices in different directions and out of the desired path of assembly. On the other hand, if the speed of rotation of the starwheel is unduly reduced, the linear speed of the points thereof becomes less than the speed of the travel of the incoming matrices and occasionally produces jamming and transposition of matrices, to say nothing of the resulting slowdown in the rate of composition.

The present invention is directed to a matrix assembling device which eliminates the starwheel entirely, substituting in its place a continuously rotating circular wheel which forms part of a supplemental guide chute designed to direct the matrices without interruption and under positive control into the assembler.

For a more complete understanding of the invention, reference may be had to the accompanying drawings and the detailed description which follows.

Referring to the drawings.

Figure 1:
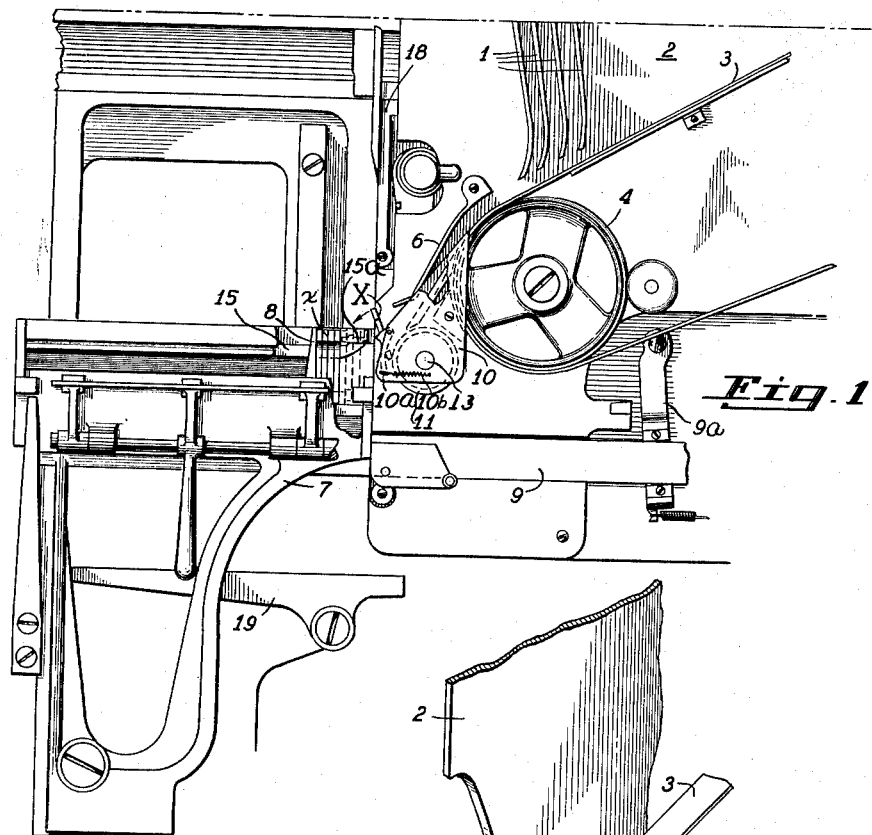
Fig. 1 is a front elevation of the improved assembling mechanism as applied to a Linotype machine.

The matrices X are released from their storage magazine (not shown) by the operation of a keyboard and fall by gravity between guides 1 in a vertical assembler entrance 2 onto an inclined continuously moving conveyor belt 3 which discharges them one after another, in the order of their release, into a main chute through which they pass on their way to the assembler elevator 7. Here the matrices are composed in line with spacebands Y and the line thereafter delivered to the casting mechanism. During composition, the line is supported by a line resistant finger 8 carried by a yielding slide 9, which is held against retrograde movement by a brake 9a.

Figure 2:
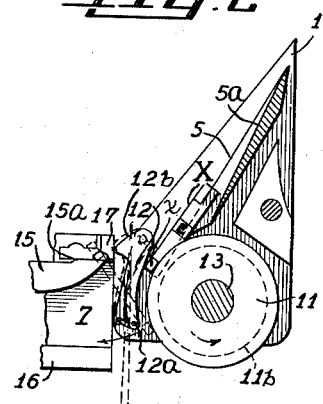
Fig. 2 is an enlarged front elevation, with certain parts removed and other parts in section.
Figure 3:
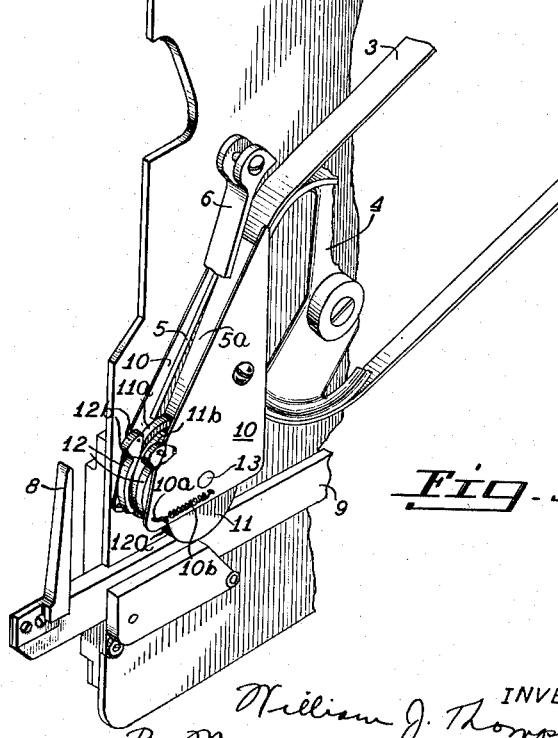
Fig. 3 is a perspective view, looking from the left.

The matrices X are formed, as usual, with upper and lower projecting ears $x$ which are generally located flush with the side of the matrices, that side being the bottom one as the matrices pass through the guide chute or the following one as they are advanced into the assembler elevator. However, in some of the matrix fonts in use, and for reasons well known to the art, certain of the thicker matrices are "back-milled," or, in other words, have their projecting ears spaced or offset from their bottom or following faces, the matrix X shown in Fig. 2 being of this variety.

The bottom wall of the main matrix chute above referred to is constituted by a pair of parallel guide rails 5 which are arranged to engage the matrices by their projecting ears. These rails are separated by a groove which receives the body portions of the back-milled matrices (see Fig. 2) and the bottom wall 5ª of said groove slopes downwardly away from the plane of the matrix travel. The upper wall of the main guide chute is constituted by a yielding guide or spring finger 6 (commonly known as a "chute spring") which engages the matrices by their side faces and holds them yieldingly in contact with the guide rails 5 during the passage of the matrices through the chute. Ordinarily, the bottom wall of the guide chute is flat for contact with the bottom side faces of the matrices, and hence the formation of the wall as above described is believed to be new. In passing from the chute, the matrices are guided along their opposite edges by a pair of front and rear cover plates 10, in the usual manner.

A supplemental matrix guide chute, which constitutes the principal feature of the present invention, receives the matrices from the main guide chute and directs them into the assembler elevator. The bottom or right wall of the supplemental chute is in the form of a continuously rotating wheel 11, mounted between the plates 10 and upon a shaft 13, while the upper or left wall of said chute is in the form of a pair of guide rails 12 arranged vertically at the entrance to the assembler elevator. The guide rails 12 are adapted only to engage the lower ears of the passing matrices, being spaced apart to permit the body portions of the matrices to pass between them into the assembler elevator. The wheel 11 is likewise adapted only to engage the lower ears of the passing matrices, being formed with a pair of circular rims or flanges 11ª separated by an annular groove 11ᵇ, which latter accommodates the body portions of the back-milled matrices. The rotation of the wheel 11 is in a counterclockwise direction, as indicated by the arrow in Fig. 2; and as will be noted from the same figure, the ear engaging edges of the rails 12 are circular to conform with the circularity of the wheel rims 11ª.

Preferably, and as shown, the two guide rails 12 are pivoted at their upper ends to the guide plates 10 and are provided at their lower ends with pins 12ª which play in curved slots 10ª cut through the guide plates 10 to permit a limited pivotal movement of the guide rails. Light springs 10ᵇ, attached to the protruding ends of the pins 12ª, serve to swing the guide rails 12 toward the rotating wheel 11 and hold them in concentric relation thereto, but these springs permit the rails to yield slightly away from the wheel to accommodate different ear thicknesses of matrices of different sizes, it being understood that the projecting ears of the matrices vary slightly in thickness, although not to a great extent.

The assembler elevator is formed, as usual, with a pair of supporting rails 16 upon which the matrices are supported by their lower ears. In the present instance, however, the elevator is also formed with a supplementary pair of supporting rails 15 upon which the matrices are supported by their upper ears. These upper rails, at the entrance to the assembler elevator, are formed with short raised portions 15ª to intercept the matrices by their upper projecting ears as they enter the elevator in the manner about to be described. Customary spring-pressed pawls 17 are employed to hold the end matrices within the elevator when it is raised for transfer of the line to the casting position.

The action of the parts will now be readily understood: As the matrices leave the main guide chute, their lower ends enter the flared mouth of the supplemental matrix guide chute (see Fig. 2), the rim portions 11ª of the continuously rotating wheel 11 and the concentric edges of the vertical guide rails 12 engaging the matrices solely by their lower projecting ears. In the case of back-milled matrices, such as shown, the body portions of such matrices will be accommodated by the groove 11ᵇ formed in the wheel 11. The body portions of the regular matrices, whose projecting ears are flush with their bottom or right side faces, will of course be accommodated by the space between the guide rails 12. As the matrices travel through the supplemental guide chute, partly by momentum and partly by the driving action of the continuously rotating wheel 11, they will first be straightened up and then caused to swing about their lower ears as a pivot to enter the assembler elevator with their upper ears foremost, these ears passing over the upper ends of the guide rails 12 and through a gap left between said rails and the upper wall 6 of the main guide chute (see the full line showing in Fig. 1 and the dotted line showing in Fig. 2). As the matrices thus enter the assembler elevator, their upper ears will engage the raised end portions 15ª of the upper rails 15 and cause the matrices to swing about said upper ears as a pivot to bring their lower ends into the elevator, it being noted from Fig. 2 that this second swinging action of the matrices takes place when the lower ends of the matrices have passed below the lower ends of the guide rails 12. The raised portions 15ª, which provide the necessary clearance between the lower ears of the matrices and the lower elevator rails 16, need only be long enough to support a few matrices, which latter as they are advanced in the line are permitted to drop from the raised portions 15ª onto the main portions of the rails 15 for support by their upper ears or onto the lower elevator rails 16 for support by their lower ears.

Since the ear engaging portions of the guide rails 12 are concentric with the rims 11ª of the continuously rotating wheel 11, and since the rails are maintained yieldingly in such concentric position by the springs 10ᵇ, it is evident that the wheel 11 will exert a frictional gripping action on the matrices and carry them through the supplemental guide chute. Being truly circular (or starless) the wheel 11 offers no obstruction to the passing matrices and has no tendency to hurl them out of their intended path of travel. Indeed, the guide rails 12, in cooperation with the wheel 11, maintain the matrices under complete control until the upper ears of the matrices have been caused to impinge upon the raised rail portions 15ª within the assembler elevator.

It may be noted that the guide rails 12 are formed at their upper pivoted ends with downwardly inclined surfaces 12ᵇ which not only cooperate with the upper ears of the matrices as they enter the assembler elevator, but also serve by engagement with the upper ears of the spacebands Y to direct these spacebands into the elevator. The spacebands are stored in a separate magazine (not shown) and fall by gravity through a delivery chute 18 (Fig. 1) positioned above the guide rails 12. As usual, a pivoted spaceband buffer 19 is provided to cushion the fall of the spacebands and to guide them into and along the assembler elevator as the line is composed.

The invention has been thus shown and described in preferred form, but obviously many variations and modifications may be made therein and in its mode of application which will still be comprised within its spirit. It is to be understood, therefore, that the invention is not to be limited to any specific form or embodiment, except insofar as such limitations are specified in the appended claims.

What is claimed is:

1. Typographical composing mechanism for handling matrices formed with upper and lower projecting ears including, in combination, an assembler wherein the matrices are composed in line, an inclined conveyor belt for delivering the matrices to the assembler, a main guide chute leading from the discharge end of the belt toward the assembler, and a supplemental guide chute to receive the matrices from the main guide chute and direct them into the assembler, the left wall of said supplemental guide chute comprising a pair of guide rails arranged at the entrance of the assembler to engage the matrices by their lower projecting ears and spaced apart to permit the body portions of the matrices to pass between them into the assembler, and said guide rails being pivoted at their upper ends and free to swing a limited distance at their lower ends.

2. The combination according to claim 1, including springs which act normally to hold the lower ends of the guide rails in their rightmost position.

3. Typographical composing mechanism for handling matrices formed with upper and lower projecting ears including, in combination, an assembler wherein the matrices are composed in line, an inclined conveyor belt for delivering the matrices to the assembler, a main guide chute leading from the discharge end of the belt toward the assembler, and a supplemental guide chute to receive the matrices from the main guide chute and direct them into the assembler, the left wall of said supplemental guide chute comprising a pair of guide rails arranged at the entrance of the assembler to engage the matrices by the lower projecting ears and guide them clear of the assembler, and spaced apart to permit the body portions of the matrices to pass between them into the assembler, and the right wall of said supplemental guide chute presenting a circular matrix engaging portion, the said left wall guide rails having their matrix engaging portions arranged concentric to said right wall circular matrix engaging portion.

4. Typographical composing mechanism for handling matrices formed with upper and lower projecting ears including, in combination, an assembler wherein the matrices are composed in line, an inclined conveyor belt for delivering the matrices to the assembler, a main guide chute leading from the discharge end of the belt toward the assembler, and a supplemental guide chute to receive the matrices from the main guide chute and direct them into the assembler, the left wall of said supplemental guide chute comprising a pair of guide rails arranged at the entrance of the assembler to engage the matrices by their lower projecting ears and guide them clear of the assembler, and spaced apart to permit the body portions of the matrices to pass between them into the assembler, and the right side wall of said supplemental guide chute comprising a pair of circular flanges to engage the matrices by their lower projecting ears, the said left wall guide rails having their matrix engaging portions arranged concentric to said right wall circular flanges.

5. Typographical composing mechanism for handling matrices formed with upper and lower projecting ears including, in combination, an assembler wherein the matrices are composed in line, an inclined conveyor belt for delivering the matrices to the assembler, a main guide chute leading from the discharge end of the belt toward the assembler, and a supplemental guide chute to receive the matrices from the main guide chute and direct them into the assembler, the left wall of said supplemental guide chute comprising a pair of guide rails arranged at the entrance of the assembler to engage the matrices by their lower projecting ears and guide them clear of the assembler, and spaced apart to permit the body portions of the matrices to pass between them into the assembler, and the right wall of said supplemental guide chute comprising a continuously rotating wheel presenting a pair of circular rims to engage the matrices by their lower projecting ears, the said left wall guide rails having their matrix engaging portions arranged concentric to the circular rims of said right wall rotating wheel.

6. The combination according to claim 5, wherein the circular rims of the continuously rotating wheel are separated by an annular groove to receive the body portions of matrices whose projecting ears are not flush with the right side faces of the matrices.

7. Typographical composing mechanism for handling matrices formed with upper and lower projecting ears including, in combination, an assembler wherein the matrices are composed in line, an inclined conveyor belt for delivering the matrices to the assembler, a main guide chute leading from the discharge end of the belt toward the assembler, and a supplemental guide chute to receive the matrices from the main guide chute and direct them into the assembler, the left wall of said supplemental guide chute comprising a pair of guide rails arranged at the entrance of the assembler to engage the matrices by their lower projecting ears and spaced apart to permit the body portions of the matrices to pass between them into the assembler, and said guide rails having their matrix engaging portions curved and arranged to permit the lower projecting ears of matrices to approach the assembler in one direction and then guide said ears in a reverse direction clear of the assembler, thus causing the matrices to swing forward about their lower ears as a pivot and enter the assembler with their upper ears foremost, said matrices being free to partake of such swinging movement under the influence of the guide rails.

8. The combination according to claim 7, wherein the assembler is formed at the top with a guide rail to intercept and support the matrices by their upper projecting ears as they enter the assembler.

9. The combination according to claim 7, wherein the guide rails of the supplemental chute are formed at their upper ends with inclined surfaces leading toward the assembler and adapted to engage the projecting ears of spacebands as the latter are composed in line.

References Cited in the file of this patent

UNITED STATES PATENTS

| | | |
|---|---|---|
| 547,633 | Dodge | Oct. 8, 1895 |
| 669,400 | Rogers | Mar. 5, 1901 |
| 1,321,772 | Rapprich | Nov. 11, 1919 |
| 2,080,309 | Geisert | May 11, 1937 |

FOREIGN PATENTS

| | | |
|---|---|---|
| 620,229 | Germany | Oct. 19, 1935 |